April 21, 1931.  O. I. MOORE  1,801,361
VALVE
Filed Feb. 3, 1927

INVENTOR.
Oscar I. Moore
BY Hardway Cathey
ATTORNEYS.

Patented Apr. 21, 1931

1,801,361

UNITED STATES PATENT OFFICE

OSCAR I. MOORE, OF SHREVEPORT, LOUISIANA

VALVE

Application filed February 3, 1927. Serial No. 165,710.

This invention relates to new and useful improvements in a valve.

One object of the invention is to provide a valve of the character described, specially designed for use on pipe lines used for conveying oil and the like, and which may be readily cleansed, tested, inspected or repaired without removal from the line.

A further feature of the invention resides in the provision of a valve of the character described which may be readily tested for leaks, while in the line and while the fluid in the line is under pressure.

With the above and other objects in view this invention has particular relation to certain novel features of construction, operation and arrangement of parts, an example of which is given in this specification and illustrated in the accompanying drawings, wherein.

Figure 1:
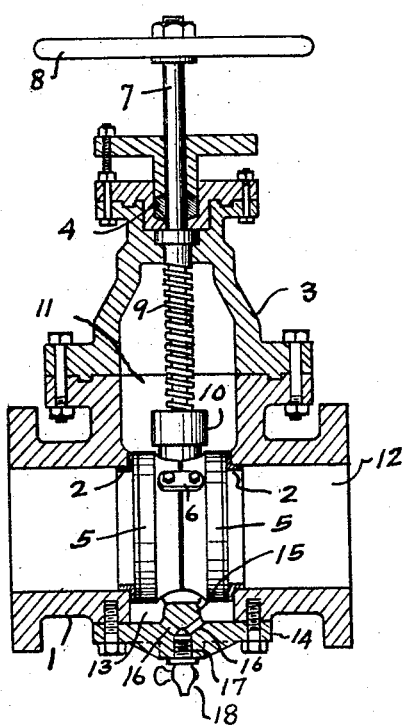
Figure 1 shows a longitudinal sectional view of the valve.
Figure 3:
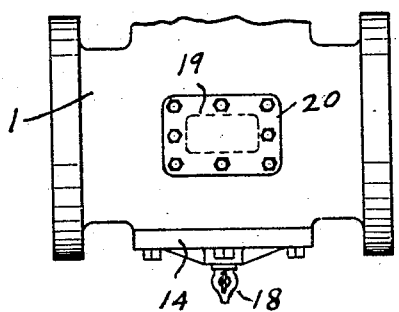
Figure 3 shows a fragmentary side view.
Figure 2:
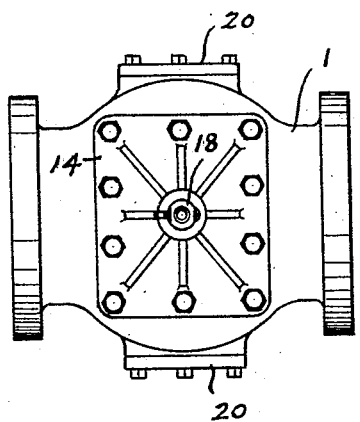
Figure 2 shows a bottom view thereof.

Referring now more particularly to the drawings, wherein like numerals of reference designate similar parts in each of the figures, the numeral 1 designates a substantially tubular valve casing adapted to be connected into, and which forms part of, a pipe line. This casing has the internal, annular valve seats 2, 2, therein, which are spaced apart. Upon the casing there is a tubular top 3, whose upper end is preferably reduced and provided with a stuffing box 4, of conventional construction. There is a pair of disc-like valves 5, 5, loosely connected together by means of oppositely disposed links 6, only one of which is shown, said connection being such as to permit a limited movement of the valves toward and from each other. There is a valve stem 7 which has a swivel connection with the top 3 and which works through said stuffing box 4. The outer end of the stem is provided with the conventional hand wheel 8 by means of which it may be turned and the inner end of the stem is threaded, as at 9 and is operatively connected with the valve actuating mechanism designated generally by the numeral 10 and which is partly located between said valves. This valve actuating mechanism is of conventional construction and is in common use in pipe line valves and has therefore not been shown in detail, as it forms no part of this invention. It is sufficient to say, however, that when the stem 7 is turned in one direction it will operate through said mechanism to release the valves from their seats 2 and to lift, or withdraw said valves into the cavity 11 above the fluid passageway 12 through the line and when said stem is rotated in the other direction the valves will descend into position to block the fluid passageway and a further manipulation of the stem will operate through the valve actuating mechanism referred to, to securely seat the valves against the seats 2 and thereby completely close the fluid passageway 12 through the line.

The mechanism hereinbefore described is of conventional construction and in common use on pipe lines. This invention is concerned with the specific construction of the valve casing 1, herein shown, and more specifically hereinafter described. The valve casing now commonly used in pipe line valves provides no practical means for access to the interior of the valve and foreign matter often collects in the cavity in the casing beneath said valve and lodges between the valves and their corresponding seats with the result that the valves cannot become properly seated causing them to leak and in such case it is often difficult to ascertain which valve, with which the pipe line is equipped, is leaking and as at present constructed it is difficult to reach the interior of the valve for repairs or replacements. The particular type of valve casing herein shown has been provided, and is of such construction, so that the valve may be easily cleaned and relieved of offending foreign matter while the fluid in the line is under pressure and may be readily tested for leakage and may be easily repaired. Beneath and between the valve seats 2 the casing is provided with an opening 13 which is normally closed by means of the substantially rectangular bottom plate 14, which is bolted to the casing. The upper side of this plate 14 has a transverse rib 15 against which the valves seat, when closed with the converging ducts 16, 16, leading from opposite sides of said rib and uniting in a drain outlet 17 which may be normally closed by a plug, or conventional drain cock, as 18.

Either, or both sides of the casing may be provided with openings, as 19, which may be closed by the plates 20, 20, which are bolted to the sides of the casing 1.

When the valves are closed, as shown in Figure 1, and it is desired to test the valve to ascertain whether or not there is any leakage the cock 18 may be opened and in case of leakage the leaking oil will drain out through one or the other duct 16 and the opening 17 and show that there is a leak in the valve, and collected foreign matter at the same time drained out. By observation it may be determined through which duct 16 the drainage occurs, and consequently which valve 5 is leaking. This determination can be arrived at in a practical way, after the plug 18 is removed, by alternately closing the passageway 16 by any suitable implement and the determination as to which valve is leaking thus made. If it be desired to further clean the valve of scale, or other foreign matter the plate 14 may be removed and the offending material cleaned out and for the purpose of gaining a more convenient access to the interior of the casing for adjusting or repairing the valves either or both of the plates 20 may be removed for this purpose, and the work above mentioned may be accomplished while the fluid in the line is under pressure.

What I claim is:

1. A valve mechanism for fluid conducting lines including a valve casing adapted to be connected into said line, and having confronting spaced valve seats, valves movable into one position to seat against said seats and block said line and movable into another position to open the line, a bottom plate secured to said casing and formed with a transverse rib having by-passes against which the valve seat and having a drain port communicating with said by-passes through which fluid leaking past either valve may be drained from the casing, and means for closing said port, said plate being removable to permit access into the interior of the casing.

2. A tubular valve casing adapted to be connected into a fluid conducting line and having a bottom opening and spaced valve seats, a bottom plate secured to said casing and closing said opening and being removable to permit access into the interior of the casing, said bottom plate having a transverse rib forming a partition between said seats, said rib having by pass conduits, communicating with said seats and converging into a drain port, means for closing said port, and valves movable into line closing position against said seats and rib.

In testimony whereof I have signed my name to this specification.

OSCAR I. MOORE.